Nov. 3, 1953  R. O. BOYKIN, JR  2,657,576
PERFORATION PRODUCTION TESTER
Filed March 3, 1947
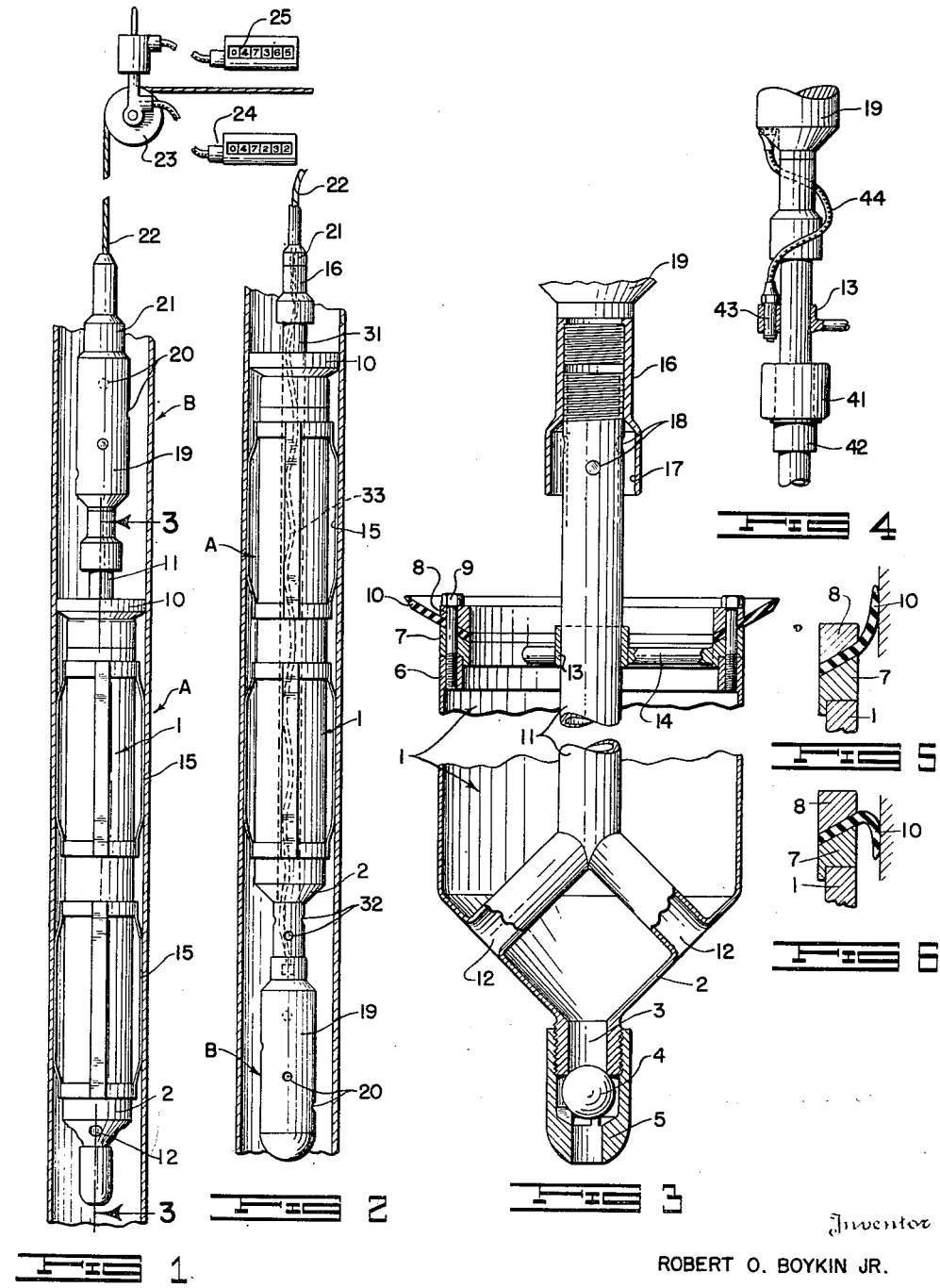
Inventor
ROBERT O. BOYKIN JR.
By Lyon & Lyon
Attorneys Patented Nov. 3, 1953

2,657,576

UNITED STATES PATENT OFFICE 2,657,576

PERFORATION PRODUCTION TESTER

Robert O. Boykin, Jr., Los Angeles, Calif.

Application March 3, 1947, Serial No. 732,093

3 Claims. (Cl. 73—155)

My invention relates to means for testing well production.

Included in the objects of my invention are:

First, to provide a means for testing well production which is particularly adapted to the testing of wells in which one or more possible productive zones occur behind the well casing.

Second, to provide a means of this character which is comparatively inexpensive both as to apparatus required and the time required to complete a test.

Third, to provide a means of this character whereby several potential productive zones may be tested in sequence without the production from a lower zone invalidating the test of a higher zone.

Fourth, to provide a means of this character which avoids the necessity of pumping wells to determine productivity.

Fifth, to provide a means of this character which is inherently dependable, and is reliable so that production may be accurately gauged.

With the foregoing and other objects in view, reference is directed to the accompanying drawings in which:

Figure 1 is an elevational view of one form of my apparatus for testing well production showing the apparatus in position within a well casing, the casing being shown in section and showing further and diagrammatically a line suspension and weight indicating means associated with the cable which supports the apparatus.

Figure 2 is a similar sectional view of a modified form of my apparatus.

Figure 3 is an enlarged fragmentary sectional view through 3—3 of Figure 1, showing the well liquid collector and its means of suspension from a gun perforator.

Figure 4 is a reduced fragmentary view similar to Figure 2, showing the provision of a float means to indicate liquid level in the collector.

Figure 5 is an enlarged fragmentary sectional view of the collector illustrating the manner in which the yieldable deflector ring engages the wall of a surrounding casing to deflect the well production into the collector.

Figure 6 is a similar view showing the position which the deflector ring may assume when the collector is being withdrawn from the well.

My well testing apparatus is designed particularly for the testing of wells in which one or more possible productive zones occur behind the well casing.

Oil frequently occurs in series of superposed zones separated from each other. During the early life of the oil field, the wells may have been drilled to lower zones which were initially more productive than the higher ones. Upon depletion of the lower zone, it becomes desirable to communicate with the upper zones through the intervening well casing to get whatever production they may have. This has heretofore been accomplished quite successfully by gun perforating the well casing opposite the oil zones. The expense of gun perforating, however, together with the expense of testing these upper zones has limited this practice largely to wells with upper zones which have a high probability of being productive. My present apparatus and method greatly simplifies and expedites the procedure of investigating and determining the production of various production zones which may have been traversed by the well casing.

My apparatus comprises principally a collector unit A and a gun perforator unit B. Reference is first directed to Figures 1 and 3. The collector unit A includes a tubular shell 1 of as large diameter as is feasible for ready insertion into the casing of the well to be tested. The lower end of the shell 1 is closed by a bottom 2 which is preferably conical or tapered. The bottom 2 is equipped with an externally threaded nipple which forms a drain port 3. The lower end of the drain port forms a valve seat which is closed by a ball valve 4. The ball valve is encased in a cover or cap 5 screw threaded to the nipple. The cap is arranged to support the ball valve so as to provide passageways around the ball valve and is provided with a drain opening at its lower extremity to permit discharge of the contents of the collector unit when the cap is loosened.

The upper end of the shell 1 is provided with an internal flange 6. Clamp rings 7 and 8 fit on the flange 6 and are secured thereto by bolts 9. The confronting faces of the clamp rings 7 and 8 diverge upwardly and outwardly and clamp a correspondingly diverging collector ring 10 of yieldable material such as synthetic rubber. The outer periphery of the collector ring 10 is slightly larger than the casing into which the collector unit is designed to fit so as to yieldably bear against the walls of the casing.

The shell 1 is equipped with a centrally located vent tube 11 which may have Y branches at its lower end joined to the bottom 2 and forming intake openings 12. The vent tube may be centered relative to the upper end of the shell 1 by means of a collar 13 connected by spokes 14 to the lowermost clamp ring 7.

The shell 1 is preferably centered relative to the casing by means of spring cages 15, each comprising a fixed ring and a slidable ring surrounding the shell, these rings being connected by bow springs.

The upper extremity of the vent tube 11 may screw thread into a coupling 16, the lower end of which is belled to form a skirt 17. The vent tube is provided with lateral holes 18 within the skirt 17.

The gun perforator unit B includes a body 1, the lower end of which is reduced in diameter and threaded to receive and close the coupling 16. The gun perforator, per se, may be conventional, but may be designed to fire only a few shots rather than the large number commonly fired by gun perforators. As indicated by 20, the bores of the gun units are preferably uniformly spaced and point laterally in several directions.

The upper end of the gun body 19 is connected to a cable head 21 which, in turn, is connected to a cable 22. It is preferred that the cable be the conventional conductor core cable used to support gun perforators and that the gun perforator be electrically fired. However, in view of the fact, as will be brought out hereinafter, that the gun perforator is used above the liquid level in the well bore, the various conventional "go devil" gun perforator firing means may be employed.

The cable 22 passes over a measuring sheave 23 suitably associated with an indicator 24 arranged to indicate the length of cable played out and thereby indicate the depth which the gun unit and collector unit occupies in the well bore. Also associated with the measuring sheave is a weight indicator 25. Such depth and weight indicators are conventionally used with gun perforators.

Reference is now directed to Figure 2. The structure here illustrated is essentially the same as that shown in Figures 1 and 3, with the exception that the gun perforator unit B is arranged below instead of above the collector unit A. To accomplish this, a vent tube 31 is substituted for the vent tube 11. The vent tube 31 extends centrally through the bottom 2 of the shell 1, and is provided with intake openings 32. The upper end of the vent tube 31 may be as shown in Figure 3. The coupling 16, however, is adapted for connection directly to the cable head 21. The lower end of the vent tube 31 is connected to the upper end of the gun perforator body. A conductor cable 33 extends between the cable head 21 and the gun body 19, as indicated by dotted lines.

Reference is now directed to Figure 4. As will be brought out hereinafter, it may be desirable to know when the level of the liquid collected in the shell 1 approaches the upper end thereof. This may be accomplished by a float 41 surrounding the vent tube 11 and normally resting on a collar 42. A contact means 43 may be carried by the collar 13, which contact may be electrically connected through a cable 44 to wiring, not shown, contained within the body 19 of the gun perforator unit. The electrical circuit is so arranged that when the float 41 engages the contact 43, a signal may be given at the surface of the well.

My method of testing cased off formations for production employs the above-described apparatus as follows:

The gun perforator unit B and collector unit A are lowered until the gun perforator is opposite the desired zone to be tested. The gun is then fired. If the construction shown in Figure 1 is employed the collector unit need not be moved after perforation. If the construction shown in Figure 2 is used, the collector unit is lowered after the perforation is made to a point below the zone perforated by the gun unit B so as to collect the liquid production which may enter. This offers the definite advantage that an initial flow may occur before collecting the liquid. During such initial flow, debris produced by the gun perforation as well as mud or other extraneous liquid trapped behind the casing, may be discharged so that the sample later taken is free of contamination. The collector is left in place for an interval calculated to only partially fill the shell 1. The length of time which the collector unit is held in place is noted. When the collector unit is raised to the surface of the well, the volume of liquid collected is measured. This may be done by noting the height of the liquid within the shell or by discharging the liquid into a suitable measuring container. By ascertaining the volume of liquid collected and the length of time required for its collection, the productivity of the well through the perforations can be accurately determined.

If the float 41 is employed, the collector unit may be held in place until the float 41 raises and operates a signal at the surface. By this method the volume collected by the collector unit is predetermined and constant. The productivity can then be determined by noting the length of time required to fill the collector unit.

It should be noted that if the normal liquid level is above the zone to be tested, the well is first bailed until the level is below this zone.

It should be observed that the flexible collector ring 10 inherently forms a relatively fluid tight connection with the walls of the casing so that no appreciable percentage of the liquid by-passes the collector unit. When the collector unit is raised, however, the collector ring 10 is sufficiently flexible to fold downwardly as shown in Figure 6 so that during the raising of the collector unit after test, accumulations on the walls of the well casing are not added to the production liquid.

Quite often such tests must be performed in wells which produce gas, often from regions below the point of test. It is therefore desirable to employ the vent tube 11 to by-pass any such gaseous production originating below the collector unit. Thus, during raising or lowering of the collector unit and during the production test itself, any gas below the unit is free to by-pass, and therefore exerts no pressure to disturb the location of the unit in the well bore.

It should be observed that the full production of a zone need not be tested. For example, if it is anticipated that a particular zone might produce 1,000 barrels per day and therefore in excess of the capacity of the tester, the number or size of gun perforators may be limited. Thus, if the zone produced say 10 barrels a day through a single small perforation, the size of which is known, the full production may be estimated with reasonable accuracy. This method of testing is of particular advantage when it is desirable to compare flow from several zones. The same size or number of gun perforations may be made opposite the several zones and the resulting flows compared.

When the collector is raised to the surface of the well, the character of the liquid produced may be determined by inspection, and test.

Many other embodiments of the invention may be resorted to without departing from the spirit of the invention.

I claim:

1. An apparatus for measuring the flow of liquids into a cased well bore said apparatus involving: a measuring container adapted to be lowered into the cased well bore below the region at which the liquid enters; deflector means at the upper end of said container yieldably engaging the side walls to deflect liquids into said container; and means defining a passage extending through said container for by-passing any gaseous production originating below said container.

2. An apparatus for measuring the flow of liquids into a cased well bore said apparatus involving: a measuring container adapted to be lowered by cable into said cased well bore to a point below said region of liquid ingress; an upwardly diverging yieldable collector ring carried at the upper end of said container to engage the walls of the well casing and divert liquids into said container; and means defining passageways for flow past said container of gaseous production originating below said container.

3. An apparatus for testing the productivity of wells wherein the liquid level of the well, at least during test, is below the region of liquid ingress, said apparatus, involving: a cable; a gun perforator and a container suspended in tandem from said cable; said gun perforator adapted by formation of at least one aperture of predetermined size to establish a region of liquid ingress; said container adapted to be located at a point below said region of liquid ingress and above the existing liquid level in the well; means for centering said container relative to the surrounding walls of the well; and deflector means carried by said container and yieldably engageable with the said surrounding walls to divert into said container the liquid entering through said zone of ingress.

ROBERT O. BOYKIN, Jr.

References Cited in the file of this patent

UNITED STATES PATENTS

| Number | Name | Date |
|---|---|---|
| 1,200,722 | Gilmore | Oct. 10, 1916 |
| 1,606,104 | Schlueter et al. | Nov. 9, 1926 |
| 1,889,889 | Ennis | Dec. 6, 1932 |
| 1,893,162 | Cranz | Jan. 3, 1933 |
| 2,143,962 | Stone | Jan. 17, 1939 |
| 2,158,569 | Bowen | May 16, 1939 |
| 2,187,047 | Miner | Jan. 16, 1940 |
| 2,262,655 | Seale | Nov. 11, 1941 |
| 2,313,369 | Spencer | Mar. 9, 1943 |
| 2,441,894 | Mennecier | Mar. 18, 1948 |